United States Patent [19]
Ban et al.

[11] Patent Number: 4,931,838
[45] Date of Patent: Jun. 5, 1990

[54] DEVELOPING APPARATUS AND PROCESS CARTRIDGE HAVING THE SAME

[75] Inventors: Yutaka Ban, Tokyo; Toshiaki Nagashima, Yokohama, both of Japan

[73] Assignee: Canon Kabushiki Kaisha, Tokyo, Japan

[21] Appl. No.: 313,897

[22] Filed: Feb. 23, 1989

[30] Foreign Application Priority Data

Feb. 24, 1988 [JP] Japan .................................. 63-42578
Mar. 2, 1988 [JP] Japan .................................. 63-49289

[51] Int. Cl.⁵ .......................................... G03G 15/06
[52] U.S. Cl. ................................... 355/260; 355/245; 222/DIG. 1
[58] Field of Search ............... 355/211, 245, 260, 253; 222/541, DIG. 1; 118/653; 206/605, 615, 633

[56] References Cited

U.S. PATENT DOCUMENTS 4,615,608 10/1986 Mizutani ................... 222/DIG. 1 X
4,778,086 10/1988 Shibata et al. .................. 222/541 X
4,781,294 11/1988 Croce .............................. 206/605 X

FOREIGN PATENT DOCUMENTS 59-61861  4/1984  Japan .................................. 355/260
62-75659  4/1987  Japan .................................. 355/260
62-75677  4/1987  Japan .................................. 355/260
62-289872 12/1987 Japan .................................. 355/260

Primary Examiner—A. T. Grimley
Assistant Examiner—Ed Pipala
Attorney, Agent, or Firm—Fitzpatrick, Cella, Harper & Scinto

[57] ABSTRACT

A second chamber containing a developer and a first chamber within which a developing roller for applying the developer to an image bearing member is arranged are partitioned by a flexible film. The second chamber includes a developer conveying member by which the developer is conveyed into the first chamber through an opening formed in the flexible film. The opening is formed by tearing the flexible film by means of a tear tape.

42 Claims, 14 Drawing Sheets

F I G. 13A
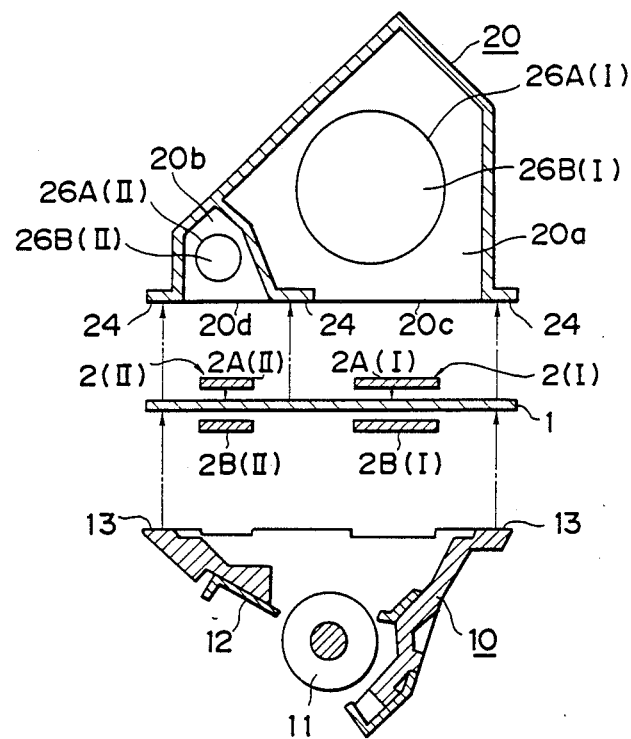

DEVELOPING APPARATUS AND PROCESS CARTRIDGE HAVING THE SAME

BACKGROUND OF THE INVENTION

1. Field of the Invention

The present invention relates to a developing apparatus for developing a latent image (an electrostatically charged latent image, potential latent image, magnetic latent image and the like) with a powder developer, which latent image is formed on an image bearing member such as an electrophotographic photosensitive element, electrostatic recording dielectric element, magnetic element and the like arranged in an image forming system (a copying machine, printer, displaying machine and the like) wherein an image is formed electrophotographically, electrostatically or magnetically. The present invention further relates to a process cartridge having such developing apparatus and adapted to be removably mounted to the image forming system.

2. Related Background Art

A conventional developing apparatus as shown in FIG. 1 comprises a developing container portion (first chamber) 10 including a developing roller or developing sleeve 11 for conveying a developer therealong and a metering blade 12 for regulating a thickness of the developer layer formed on the developing sleeve 11, and a developer container portion (second chamber) 20 formed integrally with the developing container portion 10. Between the container portions 10 and 20, a hard plate 21 is arranged as a partition. The partition plate 21 includes an elongated slit 22 formed therein and extending in a longitudinal direction of the plate (i.e., a direction perpendicular to a plane of FIG. 1), through which (slit) the developer container portion 20 communicates with the developing container portion 10. A developer agitating and conveying member 23 arranged in the developer container portion (second chamber) 20 can be turned around a pivot shaft 23a to agitate and convey the developer in the second chamber 20. Although not shown clearly in FIG. 1 for the simplicity's sake, a developer (one-component toner or two-component toner) is stored in the developer container portion 20.

When the developing apparatus is operated, the developing sleeve 11 in the developing container portion 10 is rotated in a counter-clockwise direction shown by an arrow at a predetermined peripheral speed by means of an appropriate driving means (not shown), whereas the agitating member 23 in the developer container portion 20 is turned continuously or intermittently in a clockwise direction shown by an arrow at a predetermined lower speed by means of an appropriate driving means (not shown). The developer (one-component toner, or two-component toner or toner component therein) in the developing container portion 10 (supplied from the developer container portion 20) is carried by the peripheral surface of the developing sleeve 11 to form the developer layer thereon, a thickness of which is adjusted by the metering blade 12. Then, as the developing sleeve 11 is rotated, the developer layer is brought into a developing station where the developing sleeve faces to an image bearing member (electrophotographic photosensitive rotary drum and the like) D. In the developing station, the developer (toner) on the developing sleeve 11 is transferred and adhered to the image bearing drum D selectively in accordance with a pattern of the latent image formed on the drum D to visualize (develop) the latent image.

By the rotation of the agitating member 23 in the developer container portion 20, the bridges and/or blocks included in the developer in the developer container portion 20 is destroyed or pulverized and, at the same time, the developer is gradually fed into the developing container portion 10 through the elongated slit 22 of the partition plate 21 to compensate for the used developer.

In such developing apparatus, in order to always maintain the quality of the developed image (or output image) at a predetermined constant level, it is very important that an amount of the developer (or a mixing ratio between the toner component and the carrier component (i.e., toner density) when the two-component toner is used) should be maintained always at a predetermined constant level by replenishing the used toner in the developing container portion 10 used in the developing operation with a new toner being supplied from the developer container portion 20 neither more or less. This is particularly important when the developer is the two-component toner. If the developer is supplied to the developing container portion 10 excessively, a powder pressure and/or toner density of the developer in the developing container portion 10 is increased, thus presenting a bad phenomenon such as excessive increase in the image density, fogging, scattering, smearing at image trailing end and the like, resulting in the decrease in the quality of the image.

On the other hand, if the developer is supplied to the developing container portion 10 insufficiently, the image density is decreased, thus worsening the quality of the image. Accordingly, the excessive or insufficient supply of the developer from the developer container portion 20 to the developing container portion 10 will lead to affect a bad influence upon the quality of the image.

The amount of the developer supplied from the developer container portion 20 to the developing container portion 10 depends upon a width $W_{22}$ of the elongated slit 22 and a developer conveying or discharging force of the agitating member 23.

If the width $W_{22}$ of the slit 22 is larger, there arises problems such as excessive supply of the developer, uneven supply of the developer, reverse flow of the developer from the developing container portion 10 to the developer container portion 20 and the like. For this reason, in order to supply the developer to the developing container portion 10 for easily maintaining the amount of the developer or the toner density of the developer in the developing container portion 10 always at a predetermined constant level, it is preferable that the width $W_{22}$ of the slit 22 is selected to be smaller and the developer is gradually supplied from the developer container portion 20 to the developing container portion 10 through the narrower slit 22.

In the conventional developing apparatus of this kind, the partition plate 21 having the elongated slit 22 formed therein comprises a hard plate obtained by blanking or plastic moulding. While the width $W_{22}$ of the elongated slit 22 can be optionally selected to be larger or smaller, if the width of the slit is selected to be smaller for the above reason, some agitating members 23 apply the greater resistance to the developer being pushed and passed through the slit 22 thus making the supply of the developer (through the slit) difficult, or some agitating members 23 urge or press the developer against the edge portions of the hard plate around the slit 22. Consequently, the developer is subject to the overload, with the result that the developer with the compressed solid lumps or blocks is supplied to the developing container portion 10, and/or the slit 22 is partially or wholly clogged or jammed by such lumps to present the insufficient supply of the developer.

In this connection, in the past, the width $W_{22}$ of the slit 22 was selected to have a relatively large dimension in order to avoid at least the supply of the developer lumps (to the developing container portion 10) and the insufficient supply of the developer (to the developing container portion 10) due to the jamming of the slit 22, in disregard of the excessive supply of the developer, uneven supply of the developer and/or the reverse flow of the developer (from the developing container portion 10 to the developer container portion 20).

By the way, the toner is colored pulverized powder having an average diameter of 20 μm or less, and thus, can easily be scattered even by weaker vibration, impact and/or wind pressure. Accordingly, when the developer is replenished or added to the developing apparatus by pouring the developer from an opened or unsealed developer package into the apparatus through a replenishing opening of the apparatus, unless the replenishing operation is carried out carefully, the developer (toner) is scattered out of the apparatus, thus smearing peripheral devices or elements and/or operator's fingers with the scattered toner.

In order to eliminate such problem of the scattering of the developer and to facilitate the handling of the developer, a developing apparatus obtained by integrally assembling the developing container portion and the developer container portion previously including the developer therein altogether and adapted to be removably mounted on the image forming system has been proposed and been practically used.

More particularly, such proposed developing apparatus is so constructed that a developer containing (storing) container portion previously filled with a developer confined therein is integrally mounted on a developer container portion incorporating a developer bearing member such as a developing roller or developing sleeve by which the developer is applied to an image bearing member to visualize a latent image, and that a developer supplying opening of (the developer containing container portion) communicating with the developing container portion is initially sealed by a sealing member (refer to the Japanese Patent Application Laid-Open No. 59-13262, U.S. Pat. No. 4,615,608).

In such developing apparatus, when it is not yet used, since the developer is maintained to be sealingly confined within the developer containing container portion, the developer can be effectively prevented from leaking and/or scattering out of the developing apparatus and from becoming wet or damp while the developing apparatus is being transported or stored.

In use, the sealing member sealing the developer supplying opening arranged between and communicating with the developing container portion and the developer container portion is removed by pulling it from outside of the developing apparatus to open the developer supplying opening. In this way, the developer flows from the developer container portion to the developing container portion through the opening, thus enabling the developing operation. In this case, since the unsealing of the sealing member and the supply of the developer from the developer container portion to the developing container portion are both carried out within the apparatus except the removal of the sealing member toward outside of the apparatus, the scattering and/or leakage of the developer out of the apparatus can be substantially prevented.

The developing apparatus of this kind is generally of a disposable type (i.e., when the developer has been used up, the apparatus is dumped). Accordingly, when the developer previously contained in the developer container portion has been used up, without replenishing additional developer, the whole developing apparatus, or a process cartridge (if the developing apparatus is assembled together with elements of the image forming system such as the image bearing member (photosensitive drum), cleaner, charger and the like to constitute such process cartridge) are removed from the image forming system and is replaced by a new one.

Here, an example of a technique for opening the developer supplying opening by removing the sealing member as disclosed in the U.S. Pat. No. 4,615,608 is applied to the developing apparatus of FIG. 1(A) is shown in FIGS. 1(B) and 1(C).

FIG. 1(B) is an exploded perspective view showing the above-mentioned slit 22 of the partition plate 21 of the developer container portion 20 and a sealing member 30 for sealing the slit opening.

The sealing member 30 comprises a ribbon-shaped soft sealing member (sealing ribbon) for covering the elongated slit 22 of the partition plate 21 from outside to seal the slit opening, and is adhered to a periphery 25 of an upper or outer surface of the partition plate 21 surrounding the slit opening 22 by means of an appropriate adhering method such as heat sealing, impulse sealing, high-frequency welding and the like. The sealing member 30 has an extension at its one side to form a bent portion 30A which has a free end portion 30B acting as a gripping portion, which free end portion 30B is protruded outwardly from abutted flanges 13 and 24 of the respective developing container portion 10 and developer container portion 20 at one end of the developing apparatus to provide the gripping portion, as shown in FIG. 1(C).

In use, by gripping the gripping portion 30B and by pulling the bent portion 30A toward outside of the apparatus against the adhesive force between the sealing member 30 and the periphery 25 of the partition plate 21, the sealing between the sealing member 30 and the periphery 25 is gradually released from an end of the slit 22 opposite to the gripping portion 30B toward an end of the slit near the gripping portion, and finally, when the whole of the bent portion 30A and sealing member 30 is completely extracted out of the developing apparatus, the slit opening 22 is completely opened, thus supplying the developer from the developer container portion 20 to the developing container portion 10 through the opened slit opening 22.

However, the above-mentioned sealing has the following drawbacks:

(1) It is needed for a strong force to open the slit opening 22 by separating the sealing member 30 from the periphery 25 (FIG. 1(B)) of the partition plate 21.

(2) In order to obtain the so-called "easy peel", it is difficult to control the adhesion strength (between the sealing member 30 and the periphery 25); therefore, if the peeling force is selected to be weaker, the adhesion strength will be insufficient, with the result that there arises the danger of unsealing the slit opening particularly when the surrounding temperature is lowered, thus causing the leakage of the developer and the like.

(3) Due to the crack in the sealing member and/or damage of the sealing member occurred in the sealing operation, there is a risk of tearing the sealing member during the unsealing or peeling operation, which results in making the use of developing apparatus impossible.

(4) Due to the adhering allowance of the sealing member 30, a width $W_{30}$ of the sealing member must be larger than the width $W_{22}$ of the slit opening, with the result that when, the sealing member is adhered to the developing apparatus, the bent portion 30A of the sealing member may be nipped by the container portions and/or may be adhered to the body of the sealing member if the adhesive or molten resin sticks to the bent portion, which leads to make the removal of the sealing member impossible.

(5) In the construction as shown in FIG. 1(B), since the flange portions 13 and 24 by which the developing container portion 10 and the developer container portion 20 are interconnected must be positioned outside the sealed area between the sealing member 30 and the partition plate 21, the flanges are obliged to be protruded from the body of the developing apparatus, thus preventing the compactness of the whole apparatus. Particularly, in view of the above problem (4), the distance between the interconnected flange portions and the sealed area must be relatively large, which results in difficulty in compactness of the developing apparatus more and more.

(6) When the sealing member 30 is peeled from the partition plate, since the flocculating destruction occurs in the sealed area on the periphery 25 of the partition plate 21, fine particles of the solidified adhesive may be mixed into the developer.

(7) The width $W_{22}$ of the slit opening 22 once set cannot easily be altered or adjusted, since the slit in the partition plate is formed by the blanking die or injection mould.

In order to eliminate the above-mentioned drawbacks, the following arrangement has been proposed (refer to the Japanese Patent Application Laid-Open No. 59-13262). That is to say, according to such an arrangement, in the construction of FIGS. 1(A) and 1(B), the partition plate 21 is omitted, and the sealing member 30 covers the whole opening of the developer container portion 20 and is adhered to the flange 24 of the container portion 20. And, the sealing member has a gripping end portion having the same width as a desired width of a slit to be formed in the sealing member, and the sealing member is formed to be easily torn only in the direction of the gripping portion or, seam lines are formed in the sealing member along the extension of the side edges of the gripping portion. With this arrangement, by pulling the gripping portion, a portion of the sealing member corresponding to the width of the gripping portion is separated or torn from the remaining portion of the sealing member to create an opening or slit in the sealing member, which acts as a developer supplying opening.

However, in this arrangement, as the sealing member is torn, the sealing strip portion being torn may be gradually narrower or wider. In such a case, the width of the slit opening formed in the sealing member is not uniform in a longitudinal direction thereof, thus occurring the uneven supply of the developer along the slit opening. Further, it was found that, during the tearing operation, the sealing strip being torn was sheared on the way, thus making the formation of the slit opening impossible.

SUMMARY OF THE INVENTION

An object of the present invention is to provide a developing apparatus and a process cartridge of a simple construction wherein a developer is supplied from a developer containing container portion (second chamber) to a developing container portion (first chamber) through an opening formed in a partition arranged between the container portions by means of a feeding member positioned in the second chamber, and which can prevent the formation of the compressed lumps of the developer and/or supply of such developer lumps into the first chamber and/or jamming of the opening due to such lumps, if a width of the opening is set to be smaller in order to restrain an amount of supply of the developer to a less extent or prevent reverse flow of the developer from the first chamber to the second chamber.

Another object of the present invention is to provide a developing apparatus and a process cartridge of a simple construction which can easily form a developer supplying opening having a uniform longitudinal width in a sealing member separating the second chamber from the first chamber.

Other objects and features of the present invention will be apparent from the following explanation of the present invention.

BRIEF DESCRIPTION OF THE DRAWINGS

FIG. 13A is an exploded sectional view of a developing apparatus according to another embodiment of the present invention.

DESCRIPTION OF THE PREFERRED EMBODIMENTS

Figure 1A:
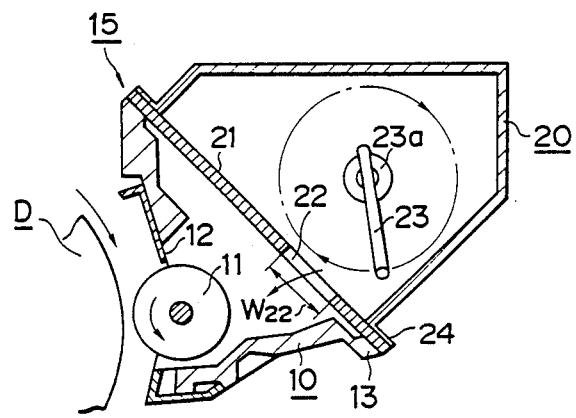
FIGS. 1A, 1B and 1C are explanatory views of a conventional developing apparatus.
Figure 1B:
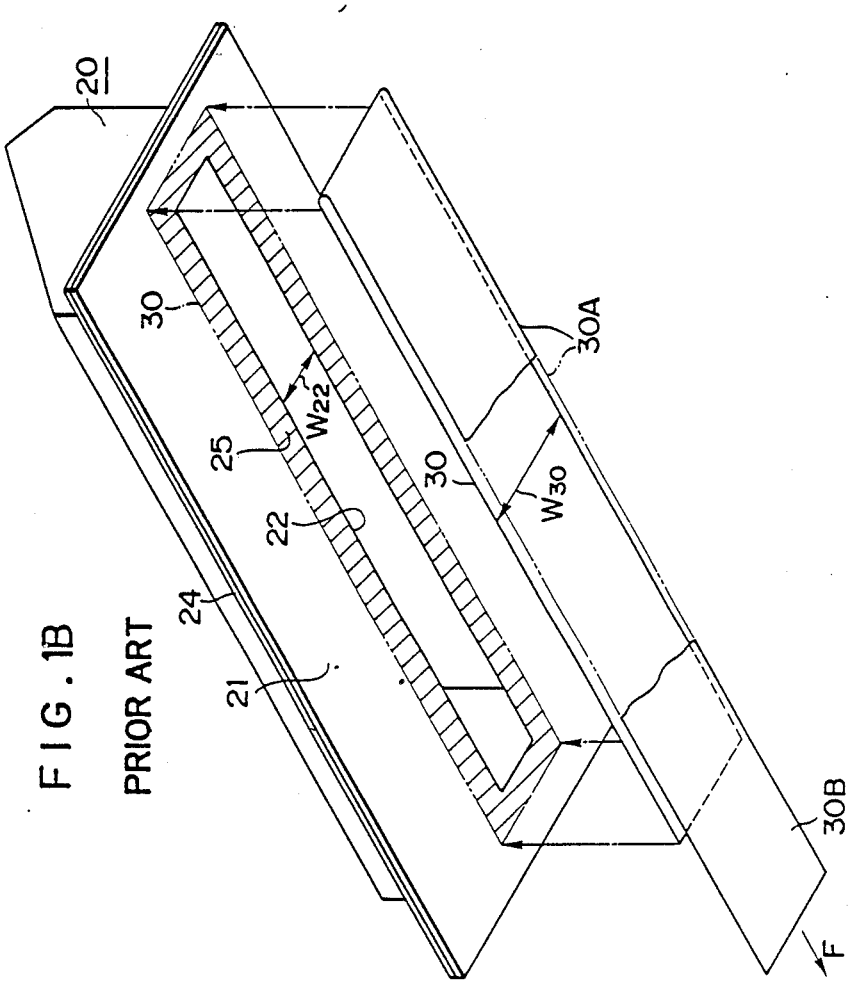
Figure 1C:
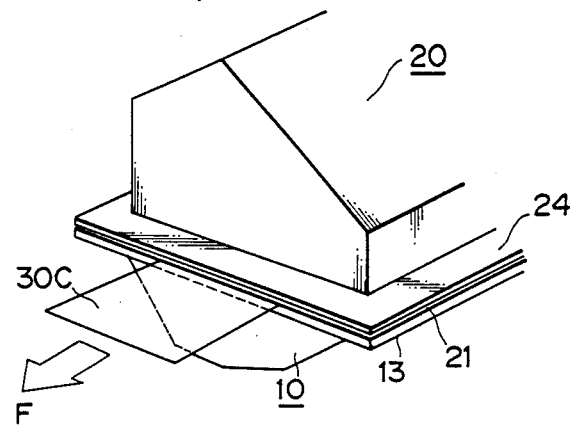

The present invention will now be explained in connection with embodiments thereof with reference to FIGS. 2 to 13(B). In these embodiments, elements or parts having the same construction and/or function as those shown in FIGS. 1(A) to 1(C) are referred to by the same reference numerals and the explanation thereof will be omitted except the particular cases.

Figure 2:
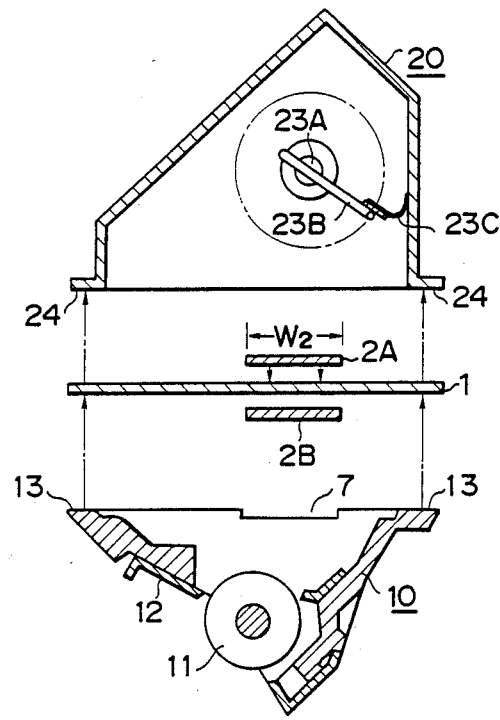
FIG. 2 is an exploded sectional view of a developing apparatus according to an embodiment of the present invention.
Figure 3:
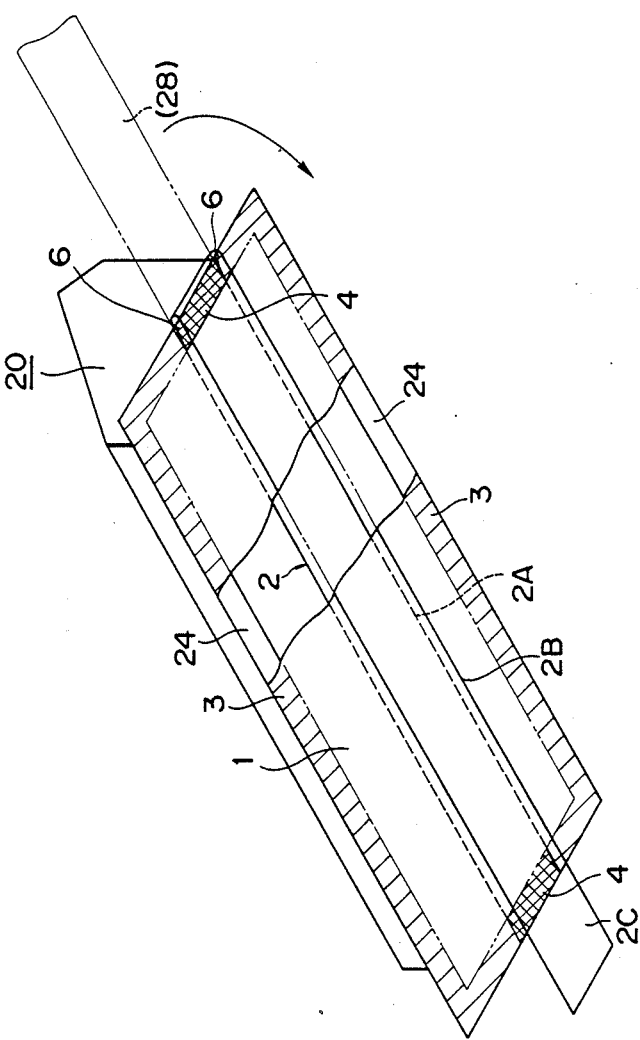
FIG. 3 is a perspective view of a developer container portion of the developing apparatus of FIG. 2, looked at from the bottom thereof.

FIG. 2 shows an exploded sectional view of a developing apparatus according to an embodiment of the present invention. In FIG. 2, the developing apparatus comprises a developing container portion 10, a developer container portion 20, and a first tearable and flexible film 1 (referred to as "seal film" hereinafter) for wholly closing a lower opening of the developer container portion 20. The seal film 1 includes a second flexible ribbon-shaped film 2 (referred to as "tear tape" hereinafter) (FIG. 3) for forming a developer supplying opening or slit in the seal film 1 by tearing a portion of the seal film. The tear tape 2 comprises a first tape portion 2A attached to and extending along an upper surface (facing the developer container portion 20) of the seal film 1, and a second tape portion 2B bent toward a lower surface of the seal tape (as shown in FIG. 3) and attached to the seal tape. A free end of the second tape portion 2B is protruded outwardly from one end of the developer container portion 20 to form a gripping portion 2C.

As shown in FIG. 3, the seal film 1 and the tear tape 2 are adhered to a flange 24 of the developer container portion 20 surrounding the opening thereof in a positional relation shown in FIGS. 2 and 3. In FIG. 3, a hatched area 3 shows an adhered portion between the seal film 1 and the developer container portion 20, and hatched areas 4 show adhered portions between the seal film 1 and the tear tape 2. As mentioned above, the opening of the developer container portion 20 is closed or sealed by the seal film 1 completely. The sealed developer container portion 20 is previously filled with a predetermined amount of a developer.

The film 1 may be adhered to the developer container 20 after the developer is filled in the container 20, or after the seal film 1 is adhered to the developer container 20 having a pouring hole 26A (FIG. 4), the developer may be introduced into the container 20 through the hole 26A and then the hole 26A may be closed by a lid 26B.

The developing apparatus is assembled by mating and abutting the flanges 24 and 13 of the respective developer container 20 and the developing container 10 and by fixing these flanges integrally by means of an appropriate means such as an ultrasonic welder. The flanges 13 and 24 may be interconnected directly or indirectly through the interposition of the seal film 1 therebetween.

Figure 4:
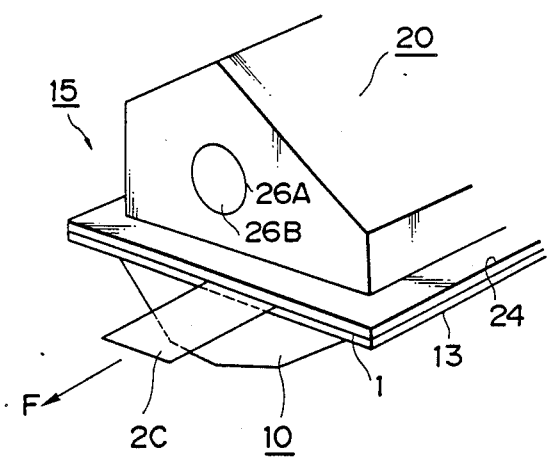
FIG. 4 is a perspective view of an end portion of the developing apparatus of FIG. 2.

Incidentally, the free end or gripping portion 2C of the bent tape portion 2B of the tear tape 2 is protruded outwardly from between the interconnected flanges 13 and 24 of the respective container 10 and 20 at one side of the developing apparatus, as shown in FIG. 4. More particularly, as shown in FIG. 2, the developing container 10 has a recess formed therein into which the tape portion 2B of the tear tape is received and from which the gripping portion 2C protrudes outwardly. The recess 7 acts as a guide for the tear tape 2 as the tear tape 2 is being drawn, as will, be described below. Further, a strip film portion torn from the seal film 1 is also drawn through the recess 7 together with the tear tape 2.

Figure 5:
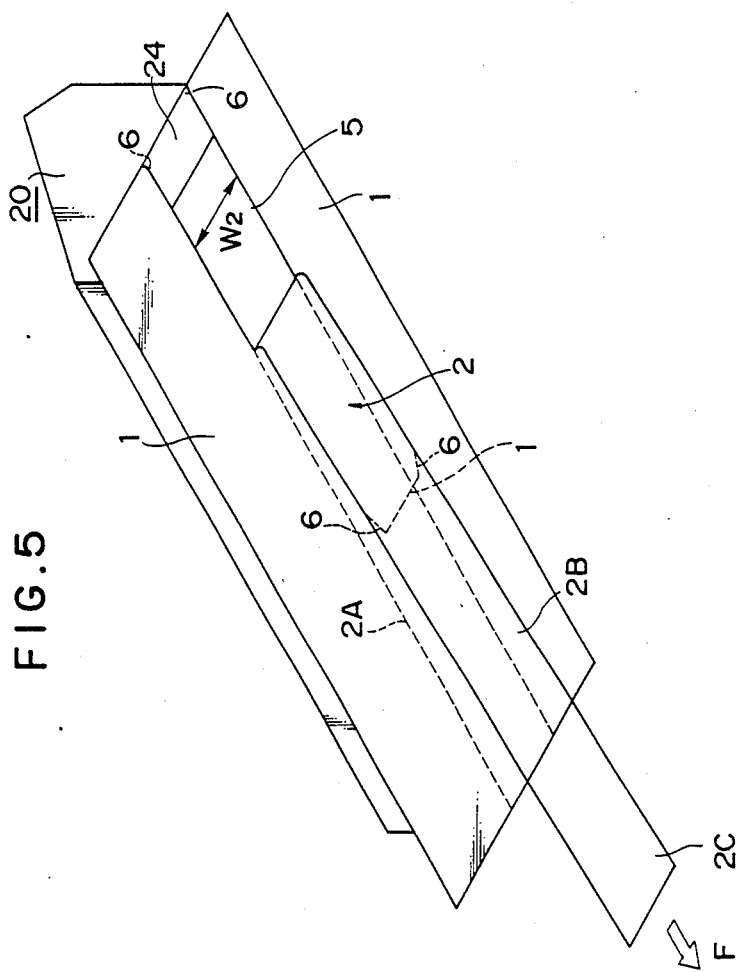
FIG. 5 is a perspective view of the developer container portion of the developing apparatus of FIG. 2 showing a condition that a tear tape is being drawn therefrom.
Figure 6:
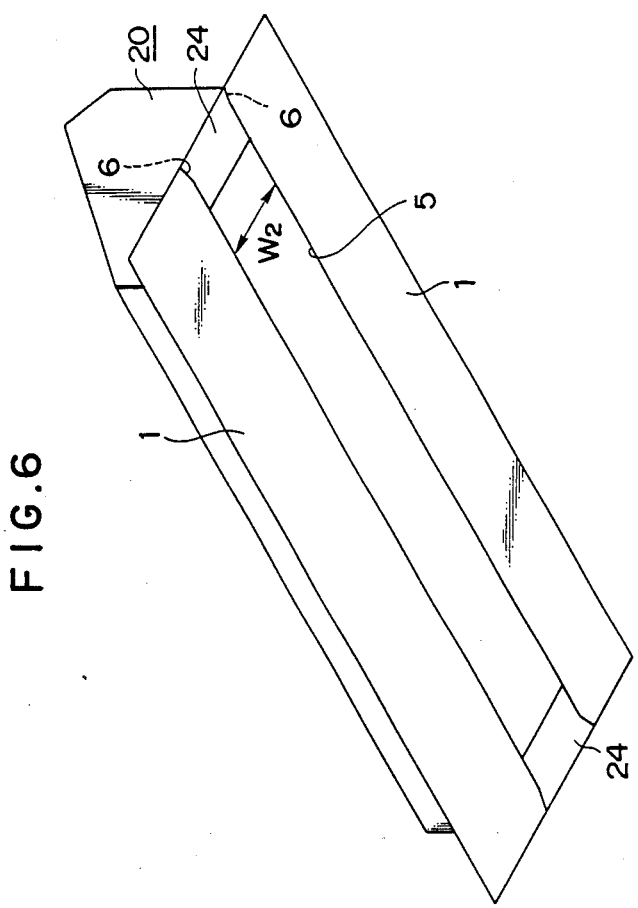
FIG. 6 is a perspective view of the developer container portion of the developing apparatus of FIG. 2 after the tear tape has been completely removed.

In use, as an operator pulls the tear tape 2 by gripping the gripping portion 2C by his fingers, the tear tape 2 is gradually drawn out, and consequently, as shown in FIG. 5, the seal film 1 is gradually torn from the opposite end along the tear tape by a width corresponding to the width of the tear tape 2. The torn film portion is drawn out together with the tear tape 2, and, at last, when the tear tape 2 is completely removed, as shown in FIG. 6, an elongated slit 5 as a developer supplying opening having the same width as that of the tear tape 2 is formed in the seal film 1. Incidentally, in FIGS. 5 and 6, the developing container 10 is omitted or not shown for the simplicity's sake.

In the illustrated embodiment, the seal film 1 and the tear tape 2 were made of composite multi-layer material having the following constructions, respectively:

| Seal film 1 | width: 60 mm | length: 228 mm |
| --- | --- | --- |
| polyester layer (1a) | | thickness 12 $\mu$m |
| aluminium layer (1b) | | thickness 7 $\mu$m |
| adhesive layer (1c) (polyethylene) | | thickness 30 $\mu$m |

| Tear tape 2 | width: 35 mm | length: 500 mm |
| --- | --- | --- |
| adhesive layer (2a) (polyethylene) | | thickness 30 $\mu$m |
| polyester layer (2b) | | thickness 25 $\mu$m |
| adhesive layer (2c) (polyethylene) | | thickness 30 $\mu$m |

Figure 7:
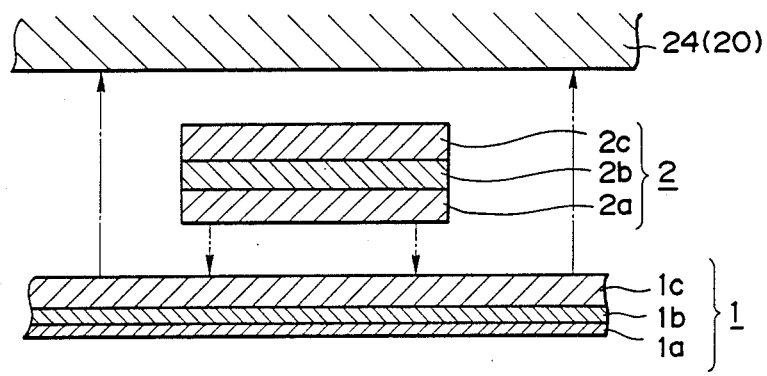
FIGS. 7 and 8 are sectional views showing constructions of a sealing member and tear tape.

FIG. 7 shows the schematic multi-layer construction of the film and tape. The adhesion between the seal film 1, tear tape 2 and the developer container portion 20 is effected by the heat seal technique by the use of seal bars having configurations corresponding to the hatched areas 3 and 4 shown in FIG. 3. The tear tape 2 is adhered to the developer container 20 through the adhesive layer 2c to form an easy peel adhesion area, and, thus, the tear tape 2 can easily be peeled from the developer container 20. Such developer container 20 (already filled with the developer) was integrally fixed to the developing container 10 by the ultrasonic welding technique to constitute the developing apparatus.

As to the developing apparatus so constructed, a pulling force F for the gripping portion 2C required to obtain the elongated slit 5 (as the developer supplying opening) by pulling the gripping portion to tear the seal film 1 through the tear tape 2 was measured. As a result, it was found that the pulling force F was in the range of 0.2–0.5 Kg (for one hundred sample developing apparatuses). Further, it was found that all of the widths $W_{22}$ of the slits 5 formed in the respective films were more than the width of the tear tape and were in the range of 35–37 mm (substantially uniform). In addition, it was ascertained that no oblique tearing of the tear tape and no shearing of the tear tape on the way occurred.

Figure 8:
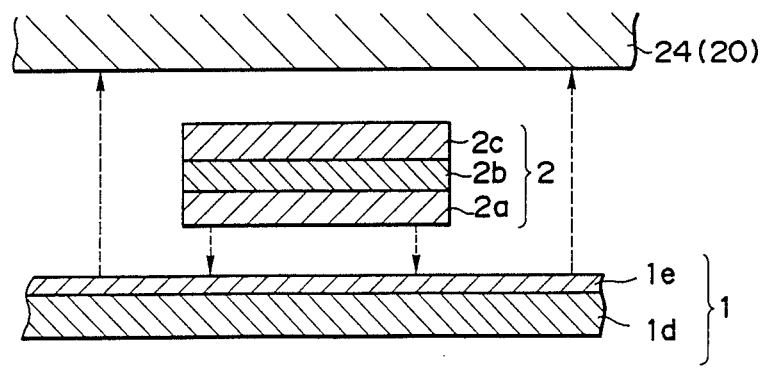

As another example, the seal film 1 and the tear tape 2 made of composite multi-layer material as shown in FIG. 8 and having the following constructions, respectively were used:

| Seal film 1 | width: 60 mm | length: 228 mm |
| --- | --- | --- |
| polypropylene foam layer (1d) (having ductility in one direction) | | thickness 120 μm |
| adhesive layer (1e) (mixture of polyethylene and EVA) | | thickness 20 μm |

| Tear tape 2 | width: 4 mm | length: 500 mm |
| --- | --- | --- |
| adhesive layer (2a) (mixture of polyethylene and EVA) | | thickness 30 μm |
| polyester layer (2b) | | thickness 38 μm |
| adhesive layer (2c) (mixture of polyethylene and EVA) | | thickness 30 μm |

Incidentally, the polypropylene film having ductility in one direction has tensile strength in an X-direction quite different from that in a Y-direction. And, the first portion 2A of the tear tape 2 is arranged along the X-direction of the seal film 1 along which the tensile strength is the largest. This is the reason why the film is more tearable in the X-direction than the Y-direction. Further, as a result of the test for one hundred sample developing apparatuses, it was found that all of the pulling forces F were included in the range of 0.3–0.6 Kg. In addition, it was ascertained that all of the widths of the slits formed in the respective seal films were included in the range of 4.0–4.7 mm, which is more uniform than that in the case of the former example.

Further, regarding the above-mentioned two examples, vibration tests, decompression tests, drop tests and high temperature and high humidity disposing tests were carried out for ten sample developing apparatuses per each test.

The vibration test was carried out under a condition that each sample was vibrated in each of X, Y, Z directions for an one hour while changing the vibration frequency from 10 Hz to 100 Hz for a period of five minutes at a gravity of 1 G by the use of vibration test papers (according to the Japanese Industrial Standard Z-0232).

The decompression test was carried out under circumstance of −30 cmHg for 30 minutes twice per sample.

The drop test was carried out in three different conditions of room temperature, −20° C. and 45° C., and each sample developing apparatus was used after the sample packaged in a predetermined way was disposed in each of the above circumstances for 24 hours. Each sample was dropped from a height of 90 cm on a concrete surface for ten times in total in the order of one corner, three edges and six faces (according to the Japanese Industrial Standard Z-0202).

The high temperature and high humidity disposing test was carried out by disposing the sample developing apparatuses in the circumstance of 45° C. and 85 RH % for a week.

Although the various tests were carried out in the above-mentioned various conditions, it was found that the seal film 1 and the tear tape 2 were not floated or separated, and the developer was not leaked at all.

EXAMPLE OF COMPARISON

The developing apparatus of the present invention was compared with the conventional developing apparatus shown in FIGS. 1(A), 1(B) and 1(C).

The sealing member 30 having a width of 30 mm and a length of 500 mm and made of composite multi-layer material of the following construction:

| polyester layer | thickness 16 μm |
| --- | --- |
| nylon layer | thickness 25 μm |
| easy peel sealant layer (polyethylene group) | thickness 40 μm |

The sealing member 30 was adhered to the polystyrene partition plate 21 including the slit opening 22 having the width of 15 mm and acting as the developer supplying opening by means of the heat seal as in the case of the first embodiment, thus closing the slit opening 22, and the partition plate 21 was fixed to the flange 24 of the developer container 20 by the ultrasonic welding technique. The same amount of the developer of the same kind as in the case of the first embodiment was filled in the so formed developer container to constitute a sample developing apparatus.

As in the case of the first embodiment, the pulling force regarding the sealing member 30 was measured for one hundred sample developing apparatuses. It was found that the pulling forces F required to form the slit in the sealing member were included in the range of 3.2–5.8 Kg, (not uniform), and was found that, in some cases, the gripping portion could not be pulled with a single hand. Further, it was ascertained that two sealing members were torn obliquely and one sealing member was sheared on the way.

Also, the vibration tests, decompression tests, drop tests and high temperature and high humidity disposing tests were carried out for ten sample developing apparatuses per each test, as in the case of the first embodiment.

In the vibration test, there was no abnormality. In the decompression test, three sealing members were floated among ten samples, but the developer was not leaked. In the drop test, there was no abnormality at the room temperature and the temperature of +45° C., but, in the tests at the temperature of −20° C., it was found that there was unsealing of the sealing member 30 and less leakage of the developer in two samples among ten samples. In the high temperature and high humidity disposing tests, three sealing members were floated among ten samples, but the developer was not leaked.

The present invention is not limited to the illustrated constructions. For example, the construction of the seal film 1 and the tear tape 2 is not limited to those shown in FIGS. 7 and 8; but may be made of various sheet or film materials. However, the tear tape 2 should have a strength enough to shear the seal film 1, and, preferably, the tear tape 2 has the tensile strength stronger than that of the seal film 1 by three times or more. A concrete example of the material for the film and tape, the seal film may be made of a synthetic resin film such as an extensible or inextensible polypropylene film, nylon film, polystyrene film and the like, and a paper, as well as the polyester/aluminium composite film and polypropylene film having ductility in one direction, and the combination thereof. That is to say, any material which is flexible and elastically deformable by a force created during the passing of the developer and can be easily torn by the pulling action of the tear tape may be used as the seal film.

However, preferably, the seal film is made of the synthetic resin film, which has tearable feature in a predetermined direction, such as a polypropylene film having ductility in one direction and a polyethylene film having ductility in one direction. This is the reason why, since the synthetic resin film having ductility in one direction has tensile strength in the X-direction different from the Y-direction perpendicular to the X-direction, the film tends to form a tearing line along the X-direction having the strongest tensile strength. Accordingly, the first portion 2A of the tear tape 2 may be arranged along the X-direction. Consequently, the elongated slit opening extending in the X-direction will be formed.

As a result of investigation of the seal film material, it was found that the polypropylene foam film having ductility in one direction was the most desirable material. This is the reason why, if this film is relatively thick, it is very easily torn in the X-direction more than the Y-direction and can create a straight tearing line, thus forming the slit opening having the uniform width with respect to the X-direction. It is particularly preferable to use the polypropylene foam film having ductility in one direction having the tensile strength in the X-direction stronger than that in the Y-direction by five times or more.

Further, it is more desirable that seam lines or cut-in lines are formed in the each seal film along both longitudinal edges of the tear tape associated with the seal film to more easily form the slit opening. In addition, it is further preferable that V-shaped notched portions 6 are formed in the seal film 1 in a position from which the tearing of the film is initiated so as to form the slit opening more smoothly, as shown in FIG. 3.

As the other material for forming the tear tape 2, any material which has a relatively strong tensile strength, such as paper, metallic foil and the like, as well as the synthetic resins similar to those used for making the seal film may be used.

The adhesion means for interconnecting the seal film 1, tear tape 2 and developer container 20 is not limited to the heat seal technique by the use of the polyethylene group sealant, but may be a heat seal technique by the use of vinyl acetate group resin or ionomer group resin, or may comprise an impulse sealing technique or ultrasonic welding technique even if an appropriate material is selected, or may comprise a double-face adhesive tape or an appropriate adhesive.

Furthermore, in the afore-mentioned embodiment, while the adhesion between the seal film 1 and the tear tape 2 was effected only in the hatched area as shown in FIG. 2, since it is more desirable that the film and the tape are adhered in as wide an area as well, it is preferable to adhere the tear tape 2 to the seal film 1 through the whole contacting area between them to obtain the more accurate slit opening.

In addition, the present invention is not limited to the afore-mentioned assembling sequence or order. In the adhesion operation between the seal film 1, tear tape 2 and developer container 20, the tear tape 2 may be adhered to the developer container 20 at first and then the seal film 1 may be adhered to the developer container and tear tape, or the seal film 1 and tear tape 2 may be adhered to each other at first and then these may be adhered to the developer container 20. Of course, the film 1, tear tape 2 and developer container 20 may be simultaneously adhered to each other as in the case of the illustrated embodiment.

Figure 9:
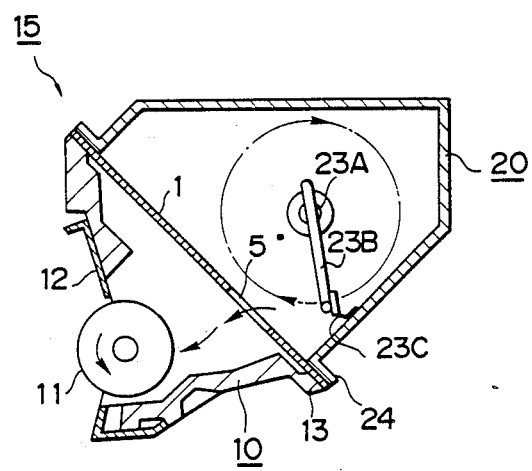
FIG. 9 is a sectional end view of the developing apparatus of FIG. 2.

FIG. 9 shows a sectional end view of the developing apparatus in a condition that the elongated slit opening 5 having substantially the same width as that of the tear tape 2 is formed in the seal film 1 separating the developer container 20 and the developing container 10 by tearing the seal film through the pulling operation of the tear tape. The developer container 20 includes a developer agitating plate or crank-shaped rod 23B (FIGS. 2 and 9) which is rotated continuously or intermittently around a pivot shaft 23B in a clockwise direction shown by an arrow at a predetermined lower speed, and a developer sweeping member 23C attached integrally to a free end of the agitating plate 23B and made of soft elastic material such as plastic sheet or rubber sheet. The sweeping member slides against an inner wall of the developer container 20 for sweeping the developer to introduce it into the slit opening 5.

Each time when the agitating plate 23B is rotated by one revolution, the tip of the developer sweeping member 23C elastically sweeps longitudinal edge portions of the elongated slit opening 5 in the seal film 1 to positively introduce the developer on such longitudinal edge portions into the developing container 10. Since the slit opening 5 is formed in the elastically flexible seal film, the longitudinal edge portions of the slit are at first flexed toward the developing container 10 to widen the slit opening and then are returned to their original positions, repeatedly, each time when the sweeping member 23C passes through them while slidingly engaging with them.

Accordingly, even if the width of the slit opening is set to be smaller, a portion of the developer conveyed by the sweeping member 23C can be positively introduced into the developing container 10 through the widened slit opening with the smallest resistance, and accordingly, without the lumps of the developer due to excessive pressure, at a substantially uniform amount determined by the dimension of the width of the slit opening and the developer pulling force of the agitating plate 23B.

Further, if the lumps of the developer tending to jam the slit opening are stuck to the peripheral edge of the slit, such lumps can be easily separated or removed from the peripheral edge of the slit due to the above-mentioned repeated vibration movement of the longitudinal edge portions of the slit formed in the flexible seal film, thus preventing the localized or whole jamming of the slit opening.

In addition, the returning movement of the longitudinal edges of the slit of the flexible seal film as mentioned above presents a check valve function for preventing the reverse flow of the developer from the developing container 10 to the developer container 20.

Figure 10:
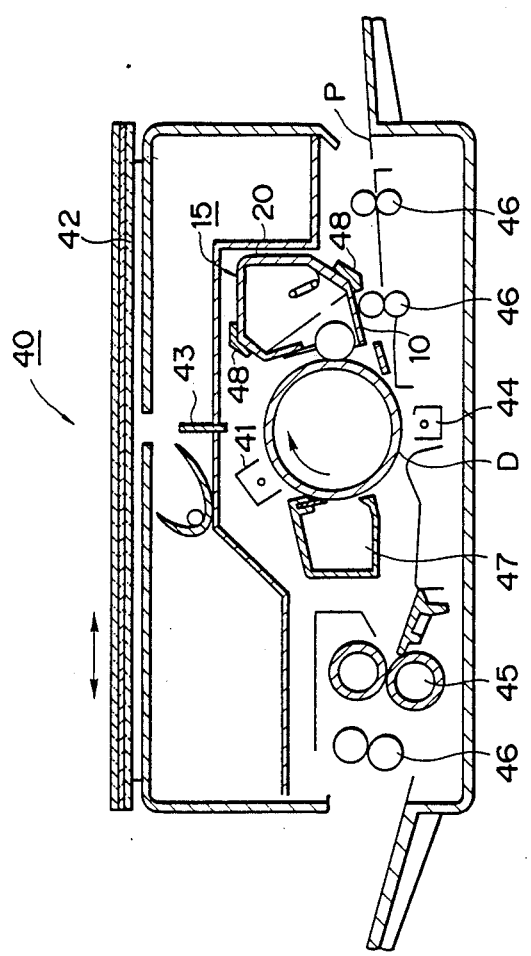
FIG. 10 is a sectional elevational view of a copying machine incorporating the developing apparatus of FIG. 2 therein.

The developing apparatus 15 obtained by integrally assembling the developing container 10 and the developer container 20 can be mounted on an image forming system. More particularly, as shown in FIG. 10, an electrophotographic copying machine 40 includes an electrophotographic photosensitive drum D rotated in a direction shown by an arrow, a charger 41 for uniformly charging the drum D, an optical system 43 for exposing an image recorded on an original situated on an original support 42 onto the drum D, the above-mentioned developing apparatus 15 for developing or visualizing a latent image formed by the above-mentioned charging and exposure, a transfer charger 44 for transferring a toner image formed by the developing onto a recording paper P, a fixing device 45 for fixing the transferred image to the recording paper P, and a cleaning device for cleaning the surface of the drum D after the image has been transferred.

The copying machine 40 further includes a guide plate 48 along which the developing apparatus 15 can be dismounted from the copying machine by pulling it forwardly. On the other hand, the developing apparatus 15 can be mounted on the copying machine by pushing the developing apparatus rearwardly (in a direction perpendicular to the plain of FIG. 10) along the guide plate 48. In this way, if the developer in the mounted developing apparatus 15 is used up, by replacing the old developing apparatus by a new one, the copying operation can be re-started.

Figure 11A:
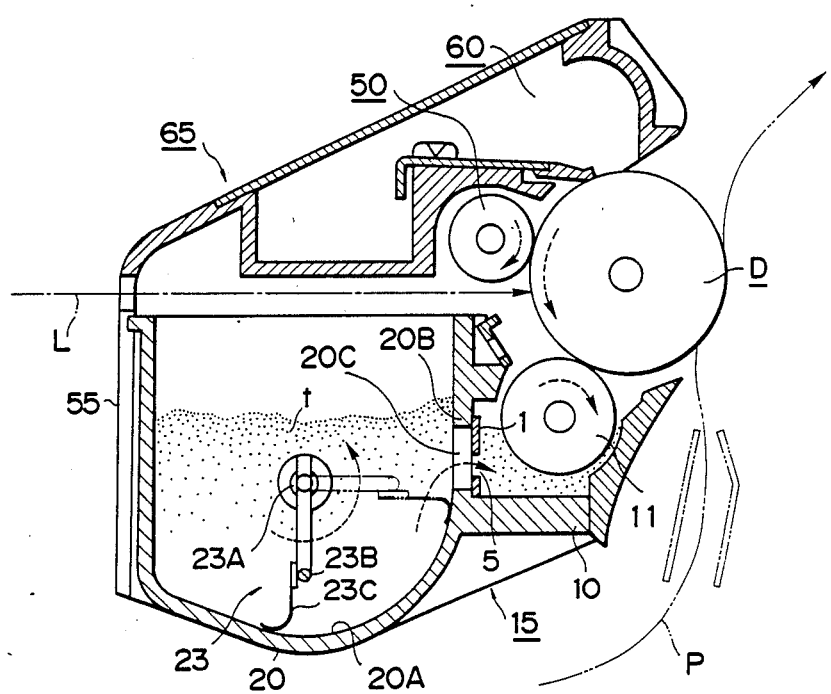
FIG. 11A is a sectional view of a process cartridge according to an embodiment of the present invention.

FIG. 11(A) shows an example of a process cartridge 65 constituted by assembling the electrophotographic photosensitive rotatable drum D (as the image bearing member), charging roller 50 (as the charger), developing apparatus 15 and the cleaner 60 altogether. The drum D, charging roller 50, developing apparatus 15 and cleaner 60 are supported by a common support 55 altogether.

In the developing apparatus incorporated into this process cartridge, since the developer container 20 is positioned at substantially the same level as or lower level than the developing container 10, the developer is not supplied by gravity, but is supplied by means of the developer agitating member 23B from the developer container 20 to the developing container 10.

Accordingly, the amount of the developer to be supplied can be more precisely controlled. Further, a lower inner surface 20A of the developer container portion 20 is configured to be complementary to the rotational trace of the sweeping member 23C, whereby all of the developer in the bottom of the developer container 20 can be conveyed into the developing container 10.

In this example, the containers 10 and 20 are formed integrally from a hard plastic by means of the moulding so that the containers 10 and 20 are separated by the hard plastic partition wall 20B. The partition wall 20B has an opening 20C through which the developer is supplied to the developing container 10 by means of agitating member means 23. The slit opening 20C extends in a direction perpendicular to a plain of FIG. 11(A). The seal film 1 as mentioned above is adhered onto a surface of the partition wall 20B facing the developing container 10. By pulling and removing the tear tape as mentioned above, the slit opening 5 as mentioned above is formed in this seal film 1. That is to say, the slit 5 is formed in the opening 20C at a side of the developing container 10. As shown, since the width of the slit 5 is smaller than that of the opening 23C, the film 1 is subject to a pressure from the developer being passed through the opening 20C and slit 5.

Figure 11B:
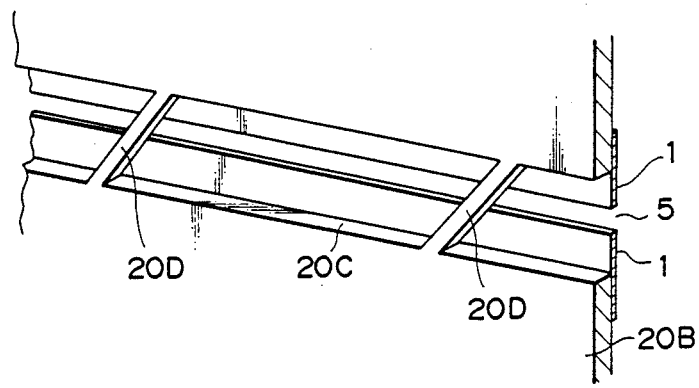
FIG. 11B is a perspective view showing a main portion of the process cartridge of FIG. 11A.

As the agitating member means 23 is rotated or turned, the sweeping member 23C intermittently passes through the back surface (surface facing the developer container 20) of the seal film 1 having the slit 5 while elastically sliding thereon, as mentioned above. In such condition, in order to prevent excessive flexing of the seal film 1 due to contacting pressure of the sweeping member 23C, an excessive opening of the elongated slit 5, separation of the seal film 1 from the adhered area, and/or shearing of the seal film, the seal film 1 is adhered to the outer surface (i.e., surface of the partition wall facing the first chamber 10) rather than the inner surface (i.e., surface of the partition wall facing the second chamber 20). In this way, an urging force of the sweeping member 23C against the seal film 1 is relieved by the thickness of the partition wall 23B. Further, in order to achieve the same object, as shown in FIG. 11(B), a single central hard pressure resisting rib or a plurality of spaced hard pressure resisting ribs 20D extending transverse to the slit may be provided on the back surface of the seal film in order to prevent that the sweeping member 23C presses against the back surface excessively.

Figure 12:
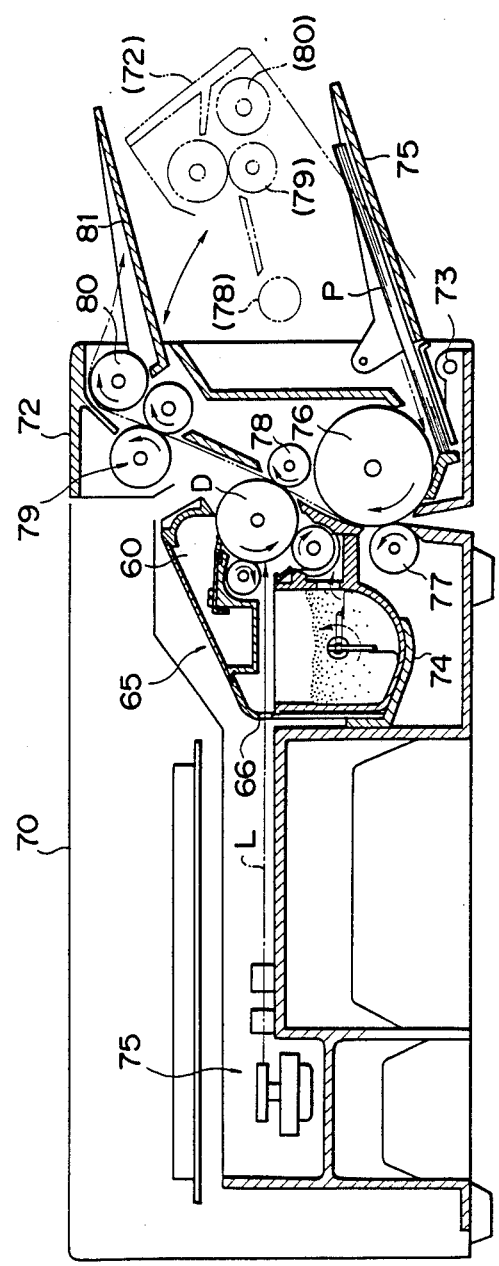
FIG. 12 is a sectional elevational view of a printer incorporating the process cartridge of FIG. 11A therein.

FIG. 12 shows a schematic view of a laser beam printer as the image forming system incorporating the process cartridge shown in FIG. 11(A) therein.

The printer is provided with an outer casing 70. The front side of the apparatus is shown in this Figure as the righthand side. The outer casing 70 includes a front door 72 which is pivotable about an axis 73 disposed at a bottom portion, so that the front door 72 may be opened as shown by dash and dotted lines or closed as shown by solid lines in this Figure. When the printer is serviced or when a process cartridge 65 is mounted onto or dismounted from the main assembly of the printer, the front door 72 is opened to allow wide access to the inside thereof.

The process cartridge 65 is detachably mountable onto the printer casing 30 at a predetermined accommodating position when the front door 72 is opened as shown by dash and dotted lines. The cartridge 65 is supported by a supporting plate 74 in the printer.

In any event, the present invention is applicable where the charging roller 50 or the cleaning device 60 is not contained in the cartridge 65 or where another process means is contained in the cartridge.

The outer casing 70 contains a laser beam scanner 75. The laser beam L from the scanner 75 travels substantially horizontally through an exposure window 66 of the cartridge 65. It reaches the photosensitive drum D at the exposure station and the photosensitive drum D is scanned in the direction of its generating line and is exposed to the laser beam.

The apparatus further comprises a multi-feeding tray 75. A plurality of sheet materials P can be set therein.

The apparatus further includes a sheet feeding roller 76, a conveying roller 77 in rolling contact with the feeding roller 76, an image transfer roller 78, a couple of image fixing rollers 79, a sheet material discharging roller 80 and a tray 81 for receiving the sheet materials discharged from the apparatus.

In the embodiments mentioned above, an example that the sweeping member 23C of the developer agitating and conveying member means 23 moved on the flexible film while slidingly contacting therewith, the sweeping member 23C may be pass through in the vicinity of the flexible seal film 1 without contacting therewith. To this end, for example, in the embodiment of FIG. 9, the width of the sweeping member 23C may be smaller, or in the embodiment of FIGS. 11(A) and 11(B), the number of the ribs 20D may be increased or the thickness of the partition wall 20B may be increased so that the tip of the sweeping member 23C does not touch the seal film 1. In any case, even in the examples that the sweeping member 23C does not contact with the seal film 1, the developer forced by the agitating member means 23 including the sweeping member 23C can elastically flex the seal film 1. Accordingly, since the film 1 relieves the pressure that the developer is applied to, the formation of the lumps of the developer can be effectively prevented. Further, since the seal film 1 can be repeatedly vibrated during the passing of the developer, the slit opening is not jammed by the lumps of the developer.

In the illustrated embodiments, while an example shows that the agitating and conveying member means 23 is provided within the developer container 20 and the developer is supplied to the developing container 10 through the rotation of the agitating and conveying member means 23, the method for forming the slit opening (for supplying the developer) by tearing the seal film 1 by the use of the tear tape 2 as mentioned above can be applied to a developing apparatus or process cartridge wherein the developer is supplied to the developing container 10 only by the gravity of the developer without provision of the agitating and conveying member means 23. In this case, since the conveying member 23 for positively feeding out the developer is not provided, it is desirable that the width of the slit opening to be formed in the seal film 1, and accordingly, the width of the tear tape 2 is wider so as to easily pass the developer through the slit opening from the developer container 20 to the developing container 10 by the gravity of the developer itself. For example, in the example of FIG. 7, when the width of the tear tape 2 was selected to be 40 mm, the slit opening having the width of 40-43 mm was obtained, and the pulling force required to pull the tear tape was 0.2-0.5 kg. On the other hand, when the width of the tear tape was selected to be 40 mm, the slit opening having the width of 40-41 mm was obtained, and the pulling force required to pull the tear tape was 0.3-0.6 kg.

Figure 13B:
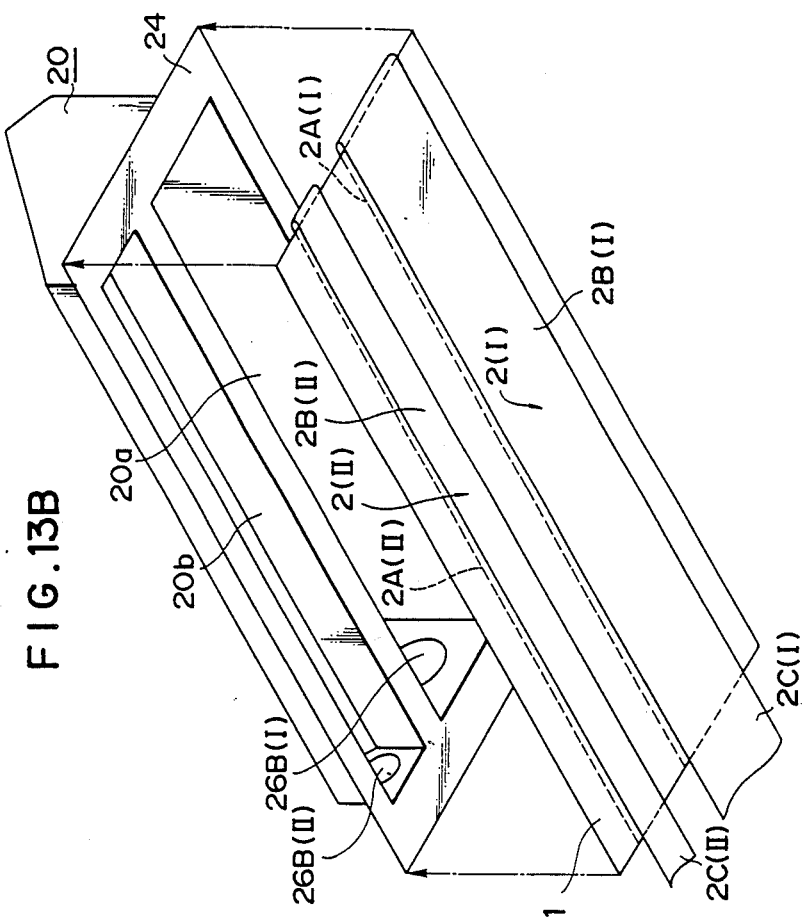
FIG. 13B is an exploded perspective view showing a main portion of the developing apparatus of FIG. 13A.

FIGS. 13(A) and 13(B) show an embodiment of the developing apparatus wherein the developer comprises a so-called two-component developer including a toner component and a carrier component. FIG. 3(A) is a sectional end view of the developing apparatus, and FIG. 13(B) is an exploded perspective view of the developer container of the developing apparatus.

The developer container 20 is divided into a large chamber 20a containing a powder developer (toner) and a small chamber 20b containing a carrier powder, and an opening 20c of the large chamber 20a and an opening 20d of the small chamber 20b are closed by a common seal film 1 adhered thereto. In order to completely isolate the large chamber 20a and the small chamber 20b, the film 1 and the container 20 are adhered to each other even between the openings 20c and 20d of the chambers 20a and 20b. The toner is poured into the chamber 20a from a hole 26A(I) and thereafter the hole 26A(I) is closed by a lid 26B(I). The carrier powder is supplied into the chamber 20b from a hole 26A(II) and thereafter the hole 26A(II) is closed by a lid 26B(II).

The unsealing of the large chamber 20a containing the powder developer (toner) and of the small chamber 20b containing the carrier powder is performed by pulling and removing two tear tapes 2(I) and 2(II) formed as in the previous embodiment and associated with the openings 2c and 2d of the chambers 2a and 3b to form slit openings having the widths corresponding to those of the tear tapes 2(I), 2(II) in the portion of the film 1 closing the openings 2c, 2d.

Also with this construction, the tearing feature, operability and other physical features mentioned above (such as features regarding the vibration test, drop test and the like) of the seal film were the same as those of the previous ones.

Further, in place of the single seal film 1, a first seal film to which the tear tape 2(I) is adhered and a second seal film to which the tear tape 2(II) is adhered may be used.

In the embodiment mentioned above, the seal film closing the developer supplying portion of the developer container remains to be fixedly adhered to the body of the developing apparatus, and accordingly, the adhered portion is not peeled even when the developer is supplied. Therefore, the seal film can be firmly adhered to the body of the developing apparatus (i.e., it is not necessary to provide the easy peel in this adhered position), and thus, the seal film has the stronger resistance against the shock in transportation and/or drop and can endure the severe circumstances to prevent the contents (developer) from leaking.

In use, by pulling the gripping portion of the free end of the tear tape, the portion of the seal film having the same width as that of the tear tape 2 is smoothly teared or separated from the remaining portion of the seal film together with the tear tape 2 to form the slit opening having substantially the same width as that of the tear tape. In this case, the pulling force required to pull the gripping portion is considerably smaller than the force required to peel the sealing member from the developer container against the adhesion force therebetween in the conventional developing apparatus, thus improving the operability of unsealing. Further, there arises no problem that the fine particles of the solidified adhesive is mixed into the developer.

Further, the dimension of the width of the formed developer supplying slit opening is considerably stable (uniform), and there is no oblique tearing and/or shearing of the tear tape. Also, the width of the slit opening can be easily altered to a desired extent by changing the width of the tear tape. In addition, the fine adjustment of the amount of supply of the developer can be easily performed merely by changing the width of the tear tape or the position of the tear tape. In assembling the developer container portion and the developing container portion altogether, these portions can be adhered to each other by the use of the adhering allowance of the seal film adhered to the developer container portion, thus making the whole developing apparatus compact.

On the other hand, to relieve the pressure applied to the periphery of the slit while the developer is being supplied from the second chamber 20 to the first chamber 10 by means of the agitating member, there is no need to provide the tear tape. Thus, in this case, the flexible film 1 having the slit opening previously formed therein may be adhered to the container 10 or 20, or as shown in FIG. 6, two flexible films 1 may be adhered to the container 10 or 20 with the clearance therebetween.

We claim:

1. A developing apparatus comprising:
   a first container portion for containing a developer;
   a second container portion within which a developer bearing member for bearing and conveying the developer supplied from said first container portion and supplying the developer to an image bearing member is arranged;
   a seal film for partitioning said first and second container portions;
   a flexible tape having a first portion extending along one surface of said seal film and a second portion bent from said first portion and extending along the other surface of said seal film; and said seal film being tearable along said first portion of said flexible tape by pulling said second portion of said flexible tape to form a passage opening through which the developer is shifted from said first container portion to said second container portion through said seal film.

2. A developing apparatus according to claim 1, wherein said seal film has a tensile strength in a direction to which said first portion of said tape is extending stronger than that in a direction perpendicular to said first-mentioned direction.

3. A developing apparatus according to claim 2, wherein said seal film includes a synthetic resin film having ductility in one direction.

4. A developing apparatus according to claim 3, wherein said first portion of said tape is adhered to said seal film.

5. A process cartridge adapted to be removably mounted on an image forming system, comprising:
an image bearing member;
a developing apparatus for developing a latent image formed on said image bearing member;
support means for supporting said image bearing member and said developing apparatus; wherein said developing apparatus including:
a first container portion for containing a developer;
a second container portion within which a developer bearing member for bearing and conveying the developer supplied from said first container portion and supplying the developer to said image bearing member is arranged;
a seal film for partitioning said first and second container portions;
a flexible tape having a first portion extending along one surface of said seal film and a second portion bent from said first portion and extending along the other surface of said seal film; and
said seal film being tearable along said first portion of said flexible tape by pulling said second portion of said flexible tape to form a passage opening through which the developer is shifted from said first container portion to said second container portion through said seal film.

6. A process cartridge according to claim 5, wherein said seal film has a tensile strength in a direction to which said first portion of said tape is extending stronger than that in a direction perpendicular to said first-mentioned direction.

7. A process cartridge according to claim 6, wherein said seal film includes a synthetic resin film having ductility in one direction.

8. A process cartridge according to claim 7, wherein said first portion of said tape is adhered to said seal film.

9. A developing apparatus comprising:
a first container portion for containing a developer;
a second container portion within which a developer bearing member for bearing and conveying the developer supplied from said first container portion and supplying the developer to an image bearing member is arranged;
a polypropylene foam film having ductility in one direction, for partitioning said first and second container portions;
a flexible tape adhered to said foam film and having a first portion extending along one surface of said foam film and a second portion bent from said first portion and extending along the other surface of said foam film;
said foam film having a tensile strength in a direction to which said first portion of said tape is extending stronger than that in a direction perpendicular to said first-mentioned direction; and
said foam film being tearable along said first portion of said flexible tape by pulling said second portion of said flexible tape to form a passage opening through which the developer is shifted from said first container portion to said second container portion through said foam film.

10. A developing apparatus according to claim 9, wherein said foam film has a tensile strength in a direction to which said first portion of said tape is extending stronger than that in a direction perpendicular to said first-mentioned direction by five times or more.

11. A developing apparatus according to claim 9 or claim 10, wherein said first portion of said flexible tape is adhered to said foam film.

12. A process cartridge adapted to be removably mounted on an image forming system, comprising:
an image bearing member;
a developing apparatus for developing a latent image formed on said image bearing member;
support means for supporting said image bearing member and said developing apparatus; wherein said developing apparatus including:
a first container portion for containing a developer;
a second container portion within which a developer bearing member for bearing and conveying the developer supplied from said first containing portion and supplying the developer to said image bearing member is arranged;
a polypropylene foam film having ductility in one direction, for partitioning said first and second container portions;
a flexible tape adhered to said foam film and having a first portion extending along one surface of said foam film and a second portion bent from said first portion and extending along the other surface of said foam film;
said foam film having a tensile strength in a direction to which said first portion of said tape is extending stronger than that in a direction perpendicular to said first-mentioned direction; and
said foam film being tearable along said first portion of said flexible tape by pulling said second portion of said flexible tape to form a passage opening through which the developer is shifted from said first container portion to said second container portion through said foam film.

13. A process cartridge according to claim 12, wherein said foam film has a tensile strength in a direction to which said first portion of said tape is extending stronger than that in a direction perpendicular to said first-mentioned direction by five times or more.

14. A process cartridge according to claim 2 or claim 13, wherein said first portion of said flexible tape is adhered to said foam film.

15. A developing apparatus comprising:
a first chamber within which a developer bearing member for bearing and conveying a developer and supplying the developer to an image bearing member is arranged;
a second chamber for containing said developer to be supplied to said first chamber;

a movable developer conveying member arranged in said second chamber, for conveying the developer from said second chamber to said first chamber;

a hard partition wall for partitioning said first and second chambers, said partition wall having an opening through which said developer conveyed from said second chamber by means of said conveying member passes;

a flexible film provided on said partition wall and having an opening of a width smaller than that of said opening of said partition wall, through which the developer conveyed by said conveying member passes.

16. A developing apparatus according to claim 15, wherein said film comprises a synthetic resin film.

17. A developing apparatus according to claim 15 or claim 16, wherein said conveying member has a rotary member rotated in said second chamber and a sweeping member fixed to said rotary member and slidingly sweeping an inner surface of said second chamber.

18. A developing apparatus according to claim 17, wherein said film is arranged on said opening of said hard partition wall at a side facing said first chamber.

19. A developing apparatus according to claim 18, wherein said opening of said hard partition wall includes at least one rib.

20. A process cartridge adapted to be removably mounted on an image forming system, comprising:
an image bearing member;
a developing apparatus for developing a latent image formed on said image bearing member;
support means for supporting said image bearing member and said developing apparatus; wherein said developing apparatus including:
a first chamber within which a developer bearing member for bearing and conveying a developer and supplying the developer to said image bearing member is arranged;
a second chamber for containing said developer to be supplied to said first chamber;
a movable developer conveying member arranged in said second chamber, for conveying the developer from said second chamber to said first chamber;
a hard partition wall for partitioning said first and second chambers, said partition wall having an opening through which said developer conveyed from said second chamber by means of said conveying member passes;
a flexible film provided on said partition wall and having an opening of a width smaller than that of said opening of said partition wall, through which the developer conveyed by said conveying member passes.

21. A process cartridge according to claim 20, wherein said film comprises a synthetic resin film.

22. A process cartridge according to claim 20 or claim 21, wherein said conveying member has a rotary member rotated in said second chamber and a sweeping member fixed to said rotary member and slidingly sweeping an inner surface of said second chamber.

23. A process cartridge according to claim 22, wherein said film is arranged on said opening of said hard partition wall at a side facing said first chamber.

24. A process cartridge according to claim 22, wherein said opening of said hard partition wall includes at least one rib.

25. A developing apparatus comprising:

a first chamber within which a developer bearing member for bearing and conveying a developer and supplying the developer to said image bearing member is arranged;

a second chamber for containing said developer to be supplied to said first chamber;

a movable developer conveying member arranged in said second chamber, for conveying the developer from said second chamber to said first chamber;

a hard partition wall for partitioning said first and second chambers, said partition wall having an opening through which said developer conveyed from said second chamber by means of said conveying member passes;

a flexible film closing said opening of said hard partition wall;

a flexible tape having a first portion extending along one surface of said flexible film and a second portion bent from said first portion and extending along the other surface of said flexible film;

said flexible film being tearable along said first portion of said flexible tape by pulling said second portion of said flexible tape to form an opening having a width smaller than that of said opening of said hard partition wall; and said developer conveyed from said second chamber by means of said conveying member being shifted into said first chamber through said opening formed in said flexible film.

26. A developing apparatus according to claim 25, wherein said flexible film has a tensile strength in a direction to which said first portion of said tape is extending stronger than that in a direction perpendicular to said first-mentioned direction.

27. A developing apparatus according to claim 26, wherein said film comprises a synthetic resin film having ductility in one direction.

28. A developing apparatus according to claim 27, wherein said film comprises a polyurethane foam having ductility in one direction.

29. A developing apparatus according to any one of claims 25 to 28, wherein said first portion of said flexible tape is adhered to said flexible film.

30. A developing apparatus according to claim 29, wherein said conveying member has a rotary member rotated in said second chamber and a sweeping member fixed to said rotary member and slidingly sweeping an inner surface of said second chamber.

31. A developing apparatus according to claim 30, wherein said film is arranged on said opening of said hard partition wall at a side facing said first chamber.

32. A developing apparatus according to claim 31, wherein said opening of said hard partition wall includes at least one rib.

33. A process cartridge adapted to be removably mounted on an image forming system, comprising:
an image bearing member;
a developing apparatus for developing a latent image formed on said image bearing member;
support means for supporting said image bearing member and said developing apparatus; wherein said developing apparatus including:
a first chamber within which a developer bearing member for bearing and conveying a developer and supplying the developer to said image bearing member is arranged;
a second chamber for containing said developer to be supplied to said first chamber;

a movable developer conveying member arranged in said second chamber, for conveying the developer from said second chamber to said first chamber;

a hard partition wall for partitioning said first and second chambers, said partition wall having an opening through which said developer conveyed from said second chamber by means of said conveying member passes;

a flexible film closing said opening of said hard partition wall;

a flexible tape having a first portion extending along one surface of said flexible film and a second portion bent from said first portion and extending along the other surface of said flexible film;

said flexible film being tearable along said first portion of said flexible tape by pulling said second portion of said flexible tape to form an opening having a width smaller than that of said opening of said hard partition wall; and said developer conveyed from said second chamber by means of said conveying member being shifted into said first chamber through said opening formed in said flexible film.

34. A process cartridge according to claim 33, wherein said flexible film has a tensile strength in a direction to which said first portion of said tape is extending stronger than that in a direction perpendicular to said first-mentioned direction.

35. A process cartridge according to claim 34, wherein said film comprises a synthetic resin film having ductility in one direction.

36. A process cartridge according to claim 35, wherein said film comprises a polyurethane foam having ductility in one direction.

37. A process cartridge according to any one of claims 33 to 36, wherein said first portion of said flexible tape is adhered to said flexible film.

38. A process cartridge according to claim 37, wherein said conveying member has a rotary member rotated in said second chamber and a sweeping member fixed to said rotary member and slidingly sweeping an inner surface of said second chamber.

39. A process cartridge according to claim 38, wherein said film is arranged on said opening of said hard partition wall at a side facing said first chamber.

40. A process cartridge according to claim 39, wherein said opening of said hard partition wall includes at least one rib.

41. A developing apparatus comprising:

a first chamber within which a developer bearing member for bearing and conveying a developer and supplying the developer to said image bearing member is arranged;

a second chamber for containing said developer to be supplied to said first chamber;

a movable developer conveying member arranged in said second chamber, for conveying the developer from said second chamber to said first chamber, said conveying member including a rotary member rotated in said second chamber and a sweeping member fixed to said rotary member and slidingly sweeping an inner surface of said second chamber;

a polypropylene foam film having ductility in one direction, for partitioning said first and second container portions;

a flexible tape having a first portion extending along one surface of said foam film and adhered to said foam film, and a second portion bent from said first portion and extending along the other surface of said foam film;

said foam film having a tensile strength in a direction to which said first portion of said tape is extending stronger than that in a direction perpendicular to said first-mentioned direction; and said foam film being tearable along said first portion of said flexible tape by pulling said second portion of said flexible tape to form a passage opening through which the developer conveyed from said second chamber by means of said conveying member is shifted to said first container portion through said foam film.

42. A process cartridge adapted to be removably mounted on an image forming system, comprising:

an image bearing member;

a developing apparatus for developing a latent image formed on said image bearing member;

support means for supporting said image bearing member and said developing apparatus; wherein said developing apparatus including:

a first container portion within which a developer bearing member for bearing and conveying a developer and supplying the developer to said image bearing member is arranged;

a second container portion for containing the developer conveyed to said first chamber;

a polypropylene foam film having ductility in one direction, for partitioning said first and second container portions;

a flexible tape having a first portion extending along one surface of said foam film and fixed to said foam film, and a second portion bent from said first portion and extending along the other surface of said foam film;

said foam film having a tensile strength in a direction to which said first portion of said tape is extending stronger than that in a direction perpendicular to said first-mentioned direction; and said foam film being tearable along said first portion of said flexible tape by pulling said second portion of said flexible tape to form a passage opening through which the developer conveyed from said second chamber by means of said conveying member is shifted to said first container portion through said foam film.

* * * * *